Sept. 8, 1970        C. H. YEW ET AL        3,527,094

APPARATUS FOR ANALYZING SUCKER-ROD WAVE MOTION

Filed Aug. 4, 1967        3 Sheets-Sheet 1

INVENTORS:
C. H. YEW
S. G. GIBBS
E. A. RIPPERGER

BY: *A. H. McCarthy*
THEIR AGENT

INVENTORS:
C. H. YEW
S. G. GIBBS
E. A. RIPPERGER
BY: J. H. McCarthy
THEIR AGENT

INVENTORS:
C. H. YEW
S. G. GIBBS
E. A. RIPPERGER
BY: A. H. McCarthy
THEIR AGENT

United States Patent Office 3,527,094
Patented Sept. 8, 1970

3,527,094
APPARATUS FOR ANALYZING SUCKER-ROD WAVE MOTION
Ching H. Yew and Eugene A. Ripperger, Austin, and Sam G. Gibbs, Houston, Tex., assignors to Shell Oil Company, New York, N.Y., a corporation of Delaware
Filed Aug. 4, 1967, Ser. No. 658,407
Int. Cl. G01l 5/00
U.S. Cl. 73—151
2 Claims

ABSTRACT OF THE DISCLOSURE

An apparatus for analyzing the elastic waves in a steel sucker-rod having a transmission line, a signal generator, and a display unit. The wave equation of the steel rod is solved to provide quantitative values for the load on and displacement of the rod at any point on its length.

BACKGROUND OF THE INVENTION

This invention relates to a method and apparatus for determining the performance characteristics of a pumping well. More particularly, the invention is directed to a method and apparatus for analyzing data received at the surface of the well to determine downhole conditions. The invention has specific application to the analysis of pumping problems in the operation of sucker rod pumping systems.

For pumping deep wells, such as oil wells, a common practice is to employ a series of interconnected rods for coupling an actuating device at the surface with a pump at the bottom of the well. This series of rods, generally referred to as the rod string or sucker rod, has the uppermost rod extending up through the well casinghead for connection with an actuating device, such as a pump jack of the walking beam type, through a coupling device frequently referred to as the rod hanger. The well casinghead includes means for permitting sliding action of the uppermost rod which is frequently referred to as the "polished rod."

In deep wells the long sucker rod has considerable stretch, distributed mass, etc., and motion at the pump end may be radically different from that imparted at the upper end. Through the years, the polished rod dynamometer has provided the principal means for analyzing the performance of rod pumped wells. The dynamometer is an instrument which records a curve, usually called a card, of polished rod load versus displacement. The shape of this curve reflects the conditions which prevail downhold in the well. Hopefully the downhole conditions can be deduced by visual inspection of the polished rod card. Owing to the diversity of card shapes, however, it is frequently impossible to make a diagnosis of downhole conditions solely on the basis of visual interpretation. In addition to being highly dependent on the skill of the dynamometer analyst, the method of visual interpretation only provides downhole data which are qualitative in nature. As a result it is frequently necessary to use complicated apparatus and procedures to directly take downhole measurements in order to accurately determine the performance characteristics at various depth levels within the well.

Recently, however, a new technique was devised for determining downhole conditions from data measured uphole at the polished rod, for example, see the copending application entitled Method of Determining Sucker Rod Pump Performance, by Sam G. Gibbs, Ser. No. 596,371, filed Oct. 21, 1966, now Pat. No. 3,343,409. In that case, it was shown that downhole conditions could be accurately determined by measuring and analyzing the loads and motions measured at the polished rod. Typically, time histories of polished rod load and displacement recorded at the well site are taken to a digital computer center where digital input is key punched from readings done by hand from the cards. Computer output is generated as a series of points that subsequently must be plotted to make a dynagraph card indicative of downhole conditions. This method, although proven to give effective results far superior to the old methods, is still time consuming and therefore expensive. For example, this method may take a day or more to produce the desired information.

SUMMARY OF THE INVENTION

The following and other objects of the invention are achieved by a method and apparatus for simulating the performance of a pump in a pumping well from the wave motion at the surface end of a sucker-rod string that extends upward from the pump. The time histories proportional to polished rod load and displacement are provided as input to a model of the sucker-rod string to simulate the operation thereof. An output quantity of the analog corresponding to the velocity of the sucker-rod is integrated and provided as to one input of an X–Y coordinate type display while a quantity corresponding to the sucker-rod load is taken from the analog and provided as the other input to the display.

It is therefore an object of this invention to provide a new and more useful way of analyzing the dynagraph data.

Another object is to provide a way of producing the desired information at the well site.

And finally it is an object of this invention to provide the desired information in minutes rather than days.

BRIEF DESCRIPTION OF THE DRAWINGS

The invention will now be described with reference to the accompanying drawings wherein:

Referring to FIG. 1, there is shown a well having the usual well casing 10 extending from the surface to the bottom thereof. Positioned within the well casing 10 is a production tubing 11 having a pump 12 located at the lower end. The pump barrel 13 contains a standing valve 14 and a plunger or piston 15 which in turn contains a traveling valve 16. The plunger 15 is actuated by a jointed sucker rod 17 that extends from the piston 15 up through the production tubing to the surface and is connected at its upper end by a coupling 18 to a polished rod 19 which extends through a packing joint 20 in the wellhead.

Figure 1:
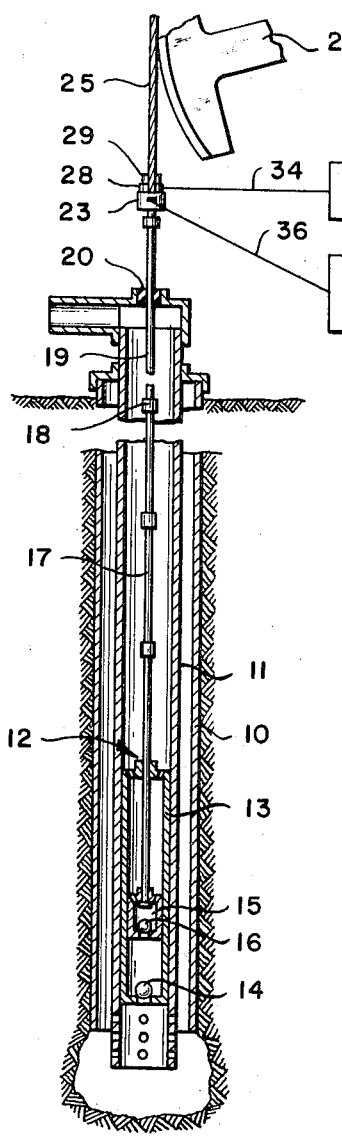
FIG. 1 is a schematic diagram partially in longitudinal section, showing the general arrangement of apparatus in a system in accordance with the invention.
Figure 2:
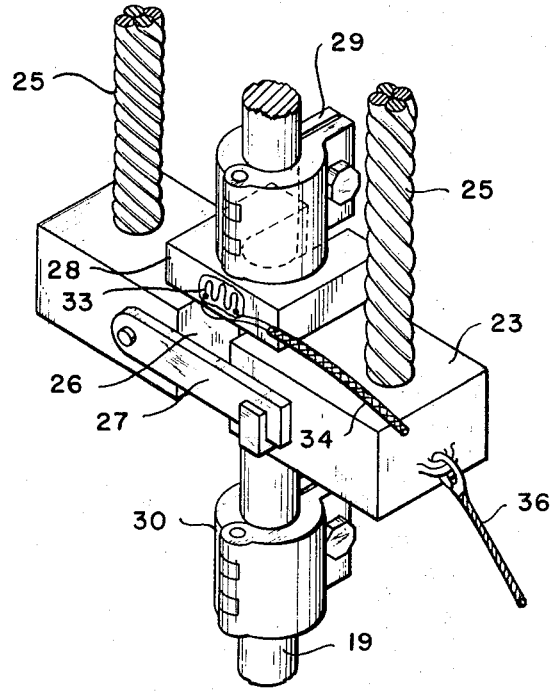
FIG. 2 is an enlarged side elevation showing a portion of the apparatus at the rod hanger.

As best shown in FIG. 2, the upper end of the polished rod 19 is connected to a hanger bar 23 suspended from a pumping beam 24 by two wire cables 25. The hanger bar 23 has a U-shaped slot 26 for receiving the polished rod 19. A latching gate 27 prevents the polished rod from moving out of the slot 26. A U-shaped platform 28 is held in place on top of the hanger bar 23 by means of a clamp 29. A similar clamp 30 is located below the hanger bar 23. A strain-gauge load cell 33, described in greater detail hereafter, is shown bonded to the platform 28. An electrical cable 34 leads from the load cell 33 to a recorder 35, and a taut wire line 36 leads from the hanger bar 23 to a displacement transducer 37 (see FIG. 1). The displacement transducer 37 is also connected to the recorder 35 by the electrical lead 38.

The strain-gauge load cell 33 is a conventional device and operates in a manner well known to those in the art. A particularly suitable load cell is the model 1011 manufactured by the Lockheed Electronics Company, Los Angeles, Calif. When the platform 28 is loaded, it becomes shorter and fatter due to a combination of axial and transverse strain. Since the wire of the strain-gauge 28 is bonded to the platform 28, it is also strained in a similar fashion. As a result, a current passed through the strain-gauge wire now has a larger cross section of wire in which to flow, and the wire is said to have less resistance. As the hanger bar 23 moves up and down, an electrical signal which relates straing-gauge resistance to polished rod load is transmitted from the load cell 33 to the recorder 35 via the electrical cable 34.

The displacement transducer 37 is a conventional unit such as the Model WR 8–150–A also manufactured by Lockheed Electronics Company. The displacement transducer unit 37 is a cable-and-reel driven, infinite resolution potentiometer that is equipped with a constant tension ("negator" spring driven) rewind assembly. As the hanger bar 23 moves up and down, the taut wire line 36 actuates the reel driven potentiometer and a varying voltage signal is produced. This signal, which relates voltage to polished rod displacement, is also transmitted to the recorder 35 via the electrical lead 38.

Figure 3:
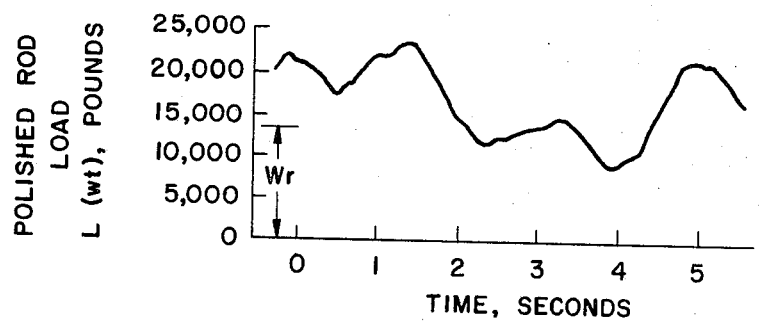
FIG. 3 is a graphical illustration of polished rod load versus time.
Figure 4:
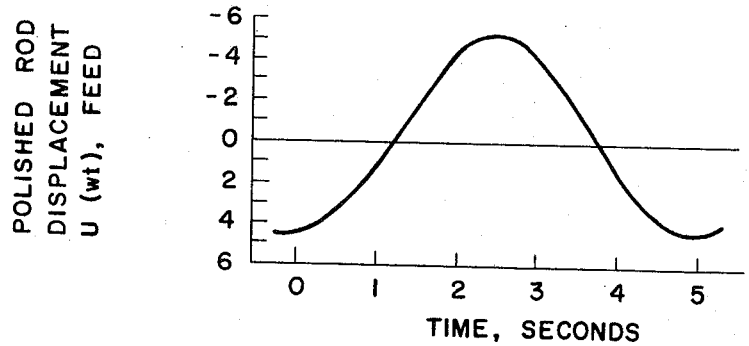
FIG. 4 is a graphical illustration of polished rod displacement versus time.

The recorder 35 may be any one of a number of instruments for recording an electrical signal. For example, multichannel magnetic tape recorders have been found to work very well. A further example is the Model G–22 Dual Channel Recorder manufactured by Varian Associates, Inc. The recorder 35 is provided with a high torque motor which drives a strip chart at the rate of 60 inches per minute. Data from the strain-gauge load cell 33 and the displacement transducer 37 are simultaneously and independently recorded on the common chart to produce curves as shown in FIGS. 3 and 4. FIG. 3 shows a typical curve of polished rod load versus time and FIG. 4 shown a curve illustrating polished rod displacement versus time.

The key part in the analysis of the pumping system performance is the method for deciphering the force data which are measured at the polished rod. This interpretive process is based on a boundary-value problem comprising a differential equation and a set of boundary conditions.

The sucker rod can be thought of as a transmission or communication line, the behavior of which is described by the viscously damped wave equation:

$$\frac{\partial^2 u(x,t)}{\partial t^2} = a^2 \frac{\partial^2 u(x,t)}{\partial x^2} - c \frac{\partial u(x,t)}{\partial t} \quad (1)$$

where:

$a$=velocity of sound in steel in feet/second;
$\partial$=damping coefficient, 1/second;
$t$=time in seconds;
$x$=distance of a point on the unrestrained rod measured from the polished rod in feet; and,
$u(x,t)$=displacement from the equilibrium position of the sucker rod in feet.

Further details on the development and validity of this equation can be found in the copending application previously referenced.

Information regarding downhole operating conditions is transmitted through the sucker rod in the form of strain waves which travel at about 16,000 feet per second. This information is monitored at the polished rod, preferably in the form of curves of polished rod load and displacement versus time as shown respectively in FIGS. 3 and 4. The boundary conditions are then formulated with this measured information or data and because Equation 1 contains no gravity term, the rod weight must be deducted from the polished rod load. This yields a dynamic load-time curve which, together with the displacement time curve, constitutes the boundary condition data required for a steady-state solution.

The boundary conditions are $$EA \frac{\partial u(0,t)}{\partial x} = L(\omega,t) - W_r \quad (2)$$

$$u(0,t) = D(\omega t) \quad (3)$$

where:

$D(\omega,t)$=recorded polished rod displacement, ft.
$L(\omega,t)$=recorded polished rod load, lb.
$W_r$=static weight of the rod, lb.
$L$=total length of the rod string, ft.
$u$=displacement of sucker rod at arbitrary position and time, ft.
$t$=time, sec.
$x$=position along the rod, ft.
$a$=velocity of wave propagation in the sucker rod, ft./sec.
$c$=damping coefficient, $l$/sec.

Since only a steady-state solution is desired, boundary conditions, Equations 2 and 3, will be sufficient for a solution of Equation 1.

Figure 5:
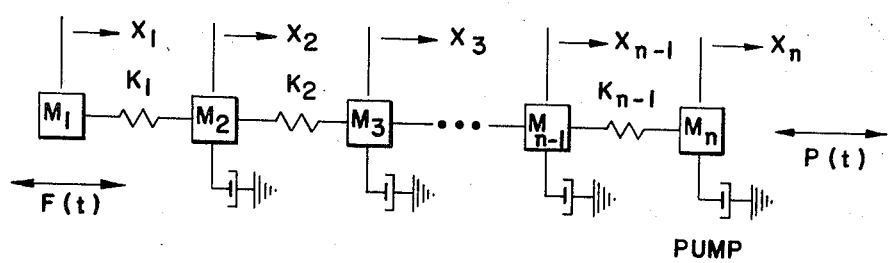
FIG. 5 is a mechanical model of a sucker-rod string.

Careful analysis has shown that Equation 1 may be very closely approximated by the loop equations of a mechanical model as shown in FIG. 5. The sucker rod may be though of as a series of masses, springs, and dashpots. Forces $F(t)$ and $P(t)$ are the forces exerted on the sucker-rod string by the prime mover and pump respectively.

The equations of motion for the mecahnical model of FIG. 5 are:

$$m_1 \ddot{x}_1 = K_1(x_2 = x_1) + F(t)$$
$$m_2 \ddot{x}_2 = -K_1(x_2 - x_1) - C_2 \dot{x}_2 + K_2(x_3 - x_2)$$
$$m_3 \ddot{x}_3 = -K_2(x_3 - x_2) - C_3 \dot{x}_3 + K_4(x_4 - x_3)$$
$$\cdot$$
$$\cdot$$
$$\cdot$$
$$m_{n-1} \ddot{x}_{n-1} = -K_{n-2}(x_{n-1} - x_{n-2}) - C_{n-1} \dot{x}_{n-1} + K_{n-1}(x_{n-1} - x_{n-1})$$
$$m_n \ddot{x}_n = -K_n(x_n - x_{n-1}) - C_n \dot{x}_n + P(t) \quad (4)$$

As the string of mechanical elements in the system of FIG. 5 is increased, Equation 4 will approach the form of Equation 1.

The recorded force, $U(\omega t)$, and displacement, $L(\omega t)$, at the polished rod are the consequences of the action of the force $F(t)$ and pump load $P(t)$. For a steady-state solution, the displacement and the load at the pump-side of the rod can therefore be calculated from the solution of Equation 1 with boundary conditions Equations 2 and 3, by setting $x=L$.

In order to enter the boundary conditions, Equations 2 and 3, into the lumped parameter system as shown in FIG. 5, a slight modification of these equations is required. The difference form of Equations 2 and 3 may be written as:

$$EA \frac{x_2 - x_1}{l} = L(\omega t) - Wr \quad (5)$$

$$x_1 = U(\omega t) \quad (6)$$

where $l = L$ (total length of the rod string)/$n$ (number of rod sections). Combining Equations 2–7 and 2–8 gives $$x_2 = \frac{l[L(\omega t) - W_r]}{EA} + D(\omega t) \quad (7)$$

and $$\dot{x}_2 = \frac{l\omega}{EA} \dot{L}(\omega t) + \omega \dot{D}(\omega t) \quad (8)$$

In other words, the present system will satisfy the imposed boundary conditions Equations 2 and 3, if the mass $M_2$ oscillates in accordance with Equation 8.

With the boundary conditions satisfied, the performance of the sucker-rod string can be known at any depth merely by generating a dynagraph card depicting the load and displacement of the analogous mechanical element of FIG. 5.

It will also be noted that Equation 1 is analogous to the equation of an electrical transmission line, i.e., the telegraphist's equation without leakage conductance:

$$L\frac{\partial^2 Q}{\partial t^2} + R\frac{\partial Q}{\partial t} = \frac{1}{C}\frac{\partial^2 Q}{\partial x^2} \qquad (9)$$

where:
L=inductance (henry)
R=resistance (ohm)
C=capacitance (farad)
Q=charge (coulomb)
x=distance (feet)
t=time (sec.)

Figure 6:
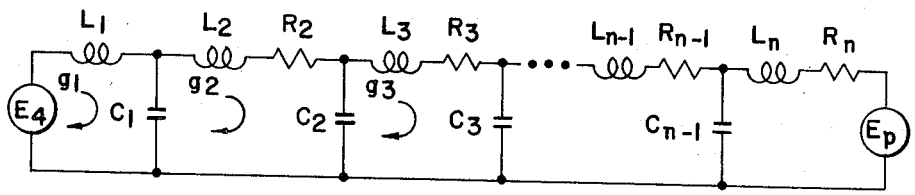
FIG. 6 is an electrical analog of a sucker-rod string.

Equation 9 may be closely approximated by an electrical analog of the model of FIG. 5 as shown in FIG. 6. After making a substitution of $$i = \frac{dq}{dt}$$

the loop equations for the circuit of FIG. 6 are:

$$L_1\ddot{q}_1 = \frac{1}{C_1}(q_2 - q_1) + E_t(t)$$

$$L_2\ddot{q}_2 = \frac{1}{C_1}(q_2 - q_1) - R_2\dot{q}_2 + \frac{1}{C_2}(q_3 - q_2)$$

$$L_3\ddot{q}_3 = \frac{1}{C_3}(q_3 - a_2) - R_3\dot{q}_3 + \frac{1}{C_4}(q_4 - q_3)$$

$$\vdots$$

$$L_{n-1}\ddot{q}_{n-1} = \frac{1}{C_{n-2}}(q_{n-1} - q_{n-2}) - R_{n-1}\dot{q}_{n-1} + \frac{1}{C_{n-1}}(q_n - q_{n-1})$$

$$L_n\ddot{q}_n = -\frac{1}{C_{n-1}}(q_n - q_{n-1}) - R_n\dot{q}_n + E_p(t) \qquad (10)$$

Again as the number of circuit elements in FIG. 6 approaches infinity, Equation 10 will approach the form of Equation 9.

For a mass-inductance analog, the scale factor relating inductance, charge, and electrical time to mass, displacement, and mechanical time are $S_1$, $S_2$, and $S_3$ in the following set of equations:

Inductance $L$ (henry)$=S_1 m$ (lb.-sec.$^2$/in.) (11)

Charge $Q$ (coulomb)$=S_2 l$ (in.) (12)

Electrical time $t_e$ (sec.)$=S_3 t_m$ (sec.) (13)

where:

$m$=total mass of the sucker rod divided by the number of segments in the simulating system $l$=total length of the sucker rod divided by the number of segments in the simulating system The scale factors for all other quantities may be determined in terms of $S_1$, $S_2$ and $S_3$, i.e., Current $i$ (amp)$=S_4 v$ (in./sec.)
$$S_4 = S_2/S_3 \qquad (14)$$

Voltage $E$ (volts)$=S_5 F$ (lb.)
$$S_5 = S_1 S_2/S_3^2 \qquad (15)$$

Resistance $R$ (ohm)$=S_6 c$ (lb.-sec./in.)
$$S_6 = S_1/S_3 \qquad (16)$$

Capacitance $C$ (farad$=S_7 \cdot l/k$ (in./l.k.)
$$S_7 = S_3^2/S_1 \qquad (17)$$

Frequency $\omega_e$ (rad./sec.)$=S_8 \omega_m$ (rad./sec.)
$$S_8 = l/S_3 \qquad (18)$$

The boundary conditions are satisfied if the current $i_2$ through inductor $L_2$ is of the form $$i_2 = S_4 \dot{X}_2 \qquad (19)$$

To complete a working simulation system, it is necessary to have a means for imposing the boundary conditions, i.e., controlling the oscillation of $m_2$ or the wave form of $i_2$, and measuring the response of some parameters of the final element of the approximating mechanical or electrical system.

For reasons of size, speed, economy, and convenience, the electrical simulation system is the preferred embodiment, and complete details of it will be hereinafter described.

Figure 7:
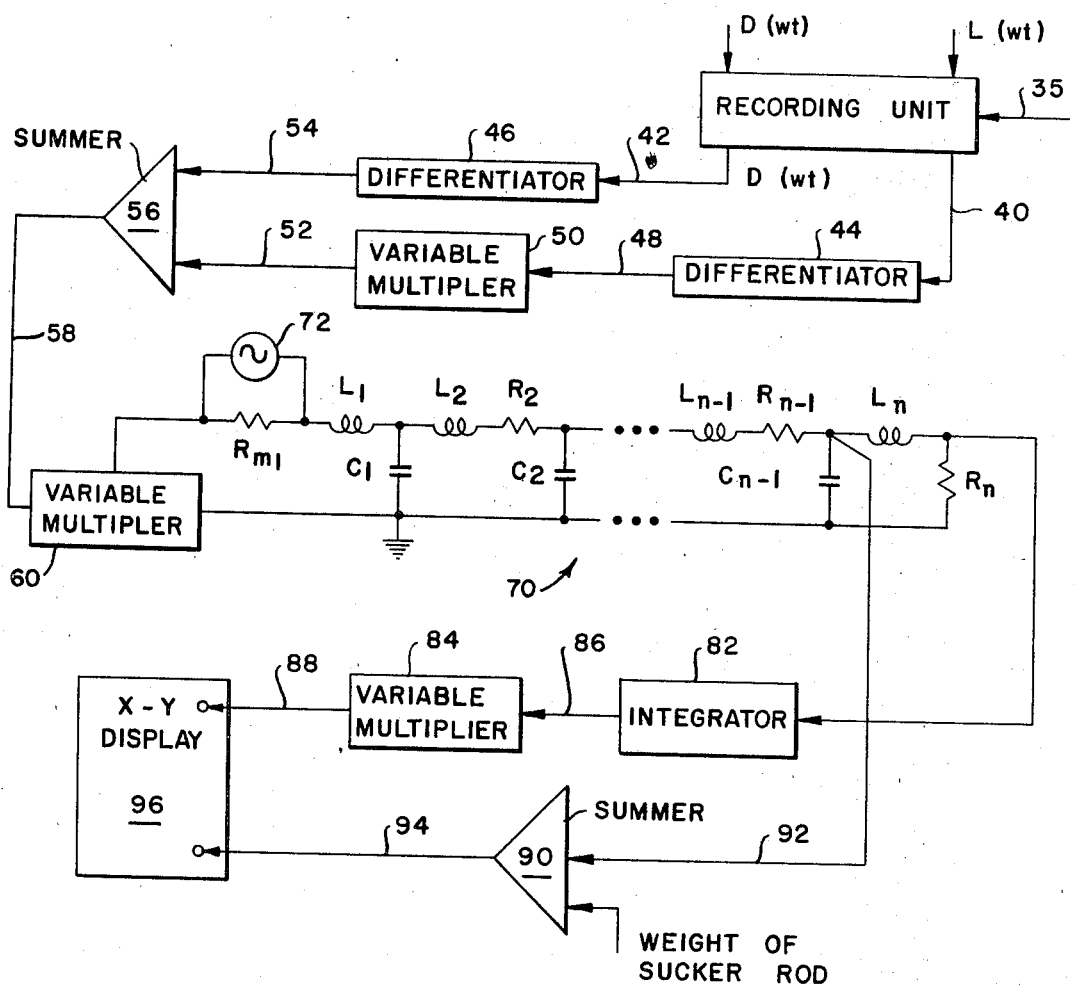
FIG. 7 is a block diagram-schematic of an electrical system made according to the teaching of the invention.
Figure 8:
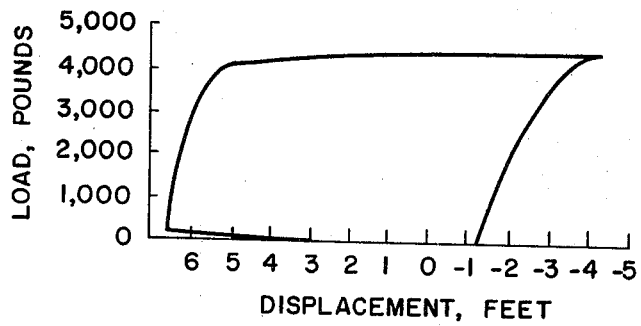
FIG. 8 is a pump dynagraph that would result from an application of the invention to a practical well situation.

As best shown in FIG. 7, a variable speed tape recorder receives on two independent channels a signal from the strain-guage load cell and a signal from the displacement transducer. The signals are recorded at some tape speed $V_1$ and are played back at another tape speed $V_2$. $V_2$ is chosen to be substantially larger than $V_1$ for scaling convenience. The measured load $L(\omega t)$ and displacement $D(\omega t)$ as measured on the sucker rod are supplied from recorder 35 through leads 40 and 42 respectively to the inputs of differentiators 44 and 46. The differentiators may be any one of several well known in the art and described in detail in Soroka, Analog Methods in Computation and Simulation, McGraw-Hill (1954). The output of differentiator 44 is supplied through lead 48 to variable multiplier 50. Variable multipliers are well known in the art and a detailed account thereof can be found in the work by Soroka, referenced above. The output of variable multiplier 50 is supplied through lead 52 to one input of a summing operational amplifier 56 where it is summed with the output of differentiator 46 supplied through lead 54 to another input of operational amplifier 56. The output of operational amplifier can be seen to be the sum of the time derivatives of the sucker-rod displacement and load. It is supplied through lead 58 to variable multiplier 60 where it is multiplied by the appropriate scaling factor in accordance with Equation 18.

The function of the above described apparatus is to provide a signal modified by the boundary conditions to the modeling means. This signal generating function although described above in electrical terms, may be done with mechanical elements. Details again may be found in the work by Soroka, cited above.

The output of variable multiplier 60 is supplied directly to the input of transmission line 70 wherein $L_1$, $L_2$ ... $L_{n-1}$, $L_n$; $R_1$, $R_2$ ... $R_{n-1}$, $R_n$; and $C_1$, $C_2$ ... $C_{n-1}$, $C_n$ are respectively precision variable inductors, resistors and capacitors all of which are well known in the art. An oscilliscope 72 may be provided to monitor the input signal.

In accordance with the above analysis, the pump load and velocity are simulated by the voltage across $C_{n-1}$ and $R_{n-1}$ and the current through inductor $L_n$ respectively. To obtain the pump displacement it is necessary only to perform an integral operation on the current through $L_n$. This can be easily achieved by supplying the voltage signal across $R_n$ through leads to the input of integrator 82 since there is a linear relationship between the voltage across and current through a resistor. The proportionality factor and any other sealing factors may be accounted for by a variable multiplier 84 that receives its input from the output of integrator 82 through lead 86.

Integrator 82 may be of the mechanical or electrical variety. Both are well known in the art, and details on their construction and operation may be found in the work by Soroka, cited above.

Any proportionality or scaling factors relative to the load function as well as the weight of the rod are accounted for by summer 90. The voltage across $C_{n-1}$ and $R_{n-1}$ is supplied through lead 92 to the input of summer 90.

OPERATION OF THE INVENTION

The invention can be used to solve a practical problem by selecting the proper values for the components. First the scaling factors as defined in Equations 11 through 18 must be chosen. For example, they may be chosen as follows:

$S_1 = 10^{-1}$      $S_5 = 10^{-2}$
$S_2 = 10^{-5}$      $S_6 = 10$
$S_3 = 10^{-2}$      $S_7 = 10^{-3}$
$S_4 = 10^{-3}$      $S_8 = 10^{-2}$

Substituting Equation 20 into Equations 11 to 18 yields the equations for converting a mechanical model, FIG. 5, to a corresponding electrical model, FIG. 6. The equations are as follows:

Inductance $L$ (henry) $= 10^{-1} m$, Mass (lb.-sec.$^2$/in.)
Charge $Q$ (coulomb) $= 10^{-5} l$, Displacement (in.)
Electrical time $t_e$ (sec.) $= 10^{-2} t_m$, Mechanical time (sec.)
Current $i$ (amp) $= 10^{-3} v$, Velocity (in./sec.)
Voltage $E$ (volt) $= 10^{-2} F$, Force (lb.)
Resistance $R$ (ohm) $= 10$ c., Damping coefficient (lb.-sec./in.)
Capacitance $C$ (farad) $= 10^{-3}$ $(1/k)$, $k$ = spring constant (lb./in.)
Electrical frequency $\omega_e$ (rad./sec.) $= 10^2 \omega_m$, Mechanical Frequency (rad./sec.)

As an example suppose that field data was as follows:

length of the sucker-rod = 6,000 feet
diameter of the rod = ⅞ inch
speed of sound of the rod = 16,000 feet per second Further suppose that the rod was divided into 10 subdivisions. Then the magnitudes of masses, spring constants, and damping coefficients for the corresponding mechanical model can be calculated from the following formulae:

$$\text{Mass: } m = \frac{Al\rho}{g} = 3.17 \text{ lb.-sec.}^2/\text{in.}$$

$$\text{Spring constant: } k = \frac{AE}{l} = 2,500 \text{ lb./in.}$$

$$\text{Damping coefficient: } c = \frac{24,000 \times .01}{l} \cdot m = 9.15 \text{ lb.-sec./in.}$$

An electrical transmission line model may then be constructed by calculating L, C, and R from the corresponding $m$, $k$, and $c$ in the mechanical model according to Equations 11, 12 and 13. The values of L, C, and R can then be substituted into Equation 10 and are also used to determine the values of R, L, and C as settings for the variable inductors, resistors and capacitors in the electrical model.

Boundary conditions are imposed on the transmission line by controlling the input thereto. Signals proportional to the load and displacement of the polished rod are recorded on a tape recorder at a velocity $v$, such as 5 in./sec. The signal generator that is connected to the output of the recorder modifies the playback signals to conform to Equation 19. The output of the signal generator is connected to the input of the transmission line.

A dynagraph of the sucker-rod at any depth in the well can be quickly made by sampling the current through the inductor and voltage across capacitor for the segment in the electrical transmission line model corresponding to the depth in the well of interest. For example, if one were interested in a dynagraph of the sucker-rod threequarters of the way between the polished rod and the pump, one would sample the current and voltage of the transmission line element ¾ of the way between the signal generator and end of the transmission line.

The current and voltage at the point of interest on the transmission line would then be passed through integrator 82 and summer 90, respectively, and from there, as earlier described, to an X–Y display unit. For example, a simple oscilloscope could be used, and a permanent record of the dynagraph could be made by photographing the face of the oscilloscope.

Thus, it can be seen that the present invention provides the apparatus for and method of determining the performance characateristics of a reciprocating well pump located below the fluid level of a well and having a piston therein with a sucker-rod string extending upward to a polished-rod connected to a reciprocating prime mover means at the top of the well, wherein the cross-sectional area of each rod size in the sucker-rod string, the overall length of the rods in the sucker-rod string, the weight of the sucker-rods and the pump piston, and the weight of that portion of the sucker-rod hanging in said fluid are predetermined, and wherein the load and displacement for said polished-rod are monitored, said method comprising:

Constructing a physical model of the sucker rod string in accordance with the predetermined areas and lengths of the sucker-rod string and the weight of the pump and sucker-rod string;

Obtaining a first set of two signals proportional to the load and displacement of said polished-rod from said monitoring of the load and displacement of the polished-rod;

Recording said first set of signals in real time at a recording speed $v_1$;

Playing back said recorded signals at a playback speed $v_2$ greater than $v_1$ to generate a second set of two signals;

Obtaining the time derivatives of said second set of two signals;

Combining the time derivatives of the second set of signals to generate a third signal;

Transmitting said third signal to and along said physical model to energize at least momentarily said physical model;

Obtaining signals proportional to load displacement of said physical model at a predetermined point along said model.

We claim as our invention:

1. An apparatus for simulating the performance of a pump in a pumping well from time variable signals proportional to the surface load and displacement of a sucker-rod string that extends upward from the pump to a polished-rod that is connected to a prime mover at the top of the well, said apparatus comprising:

a strain-gauge load cell having input and output means with the input means operatively coupled to the surface end of said sucker-rod string, said strain-gauge load cell for converting strain in the sucker-rod string to electrical signals;

a displacement transducer with input and output means, said input means being operatively coupled to the surface end of said sucker-rod string to convert the displacement of said sucker-rod string to an electrical signal;

a variable-speed recorder with at least two independent recording channels each provided with input and output terminals, the input of one channel being operatively connected to the output of said strain-gauge load cell, the input of the other channel being operatively connected to the output of said displacement transducer, said recorder to receive, record, and playback a first signal from said strain-gauge load cell and a second signal from said displacement transducer;

a signal generator with input and output means, said input means being operatively connected to the output of said tape recorder, said signal generator to generate a signal proportional to the sum of the time derivative of the first and second signal;

an electrical transmission line that includes a plurality of variable inductors, resistors and capacitors the number and value of which are controlled by the dimensions of said sucker-rod string, said transmission line with input means at one end and output means at the other end, said input means coupled to said signal generator;

an electrical integrator with input and output means, said input means being connected to the output of said transmission line to receive current signals therefrom, and display means with X-coordinate and Y-coordinate inputs, one of said inputs being connected to the output of said integrator and the other of said input being connected to receive voltage signals from the output of said transmission line.

2. An apparatus for simulating the performance of a pump in a pumping well from time variable signals proportional to the surface load and displacement of a sucker-rod string that extends upward from the pump to a polished-rod that is connected to a prime mover at the top of the well, said apparatus comprising:

a recording means upon which said time variable signals are recorded in real time at a recording speed $V_1$ and played back at a playback speed $V_2$ where $V_2$ is greater than $V_1$;

signal generator means operatively coupled to said recording means, said signal generator means comprising:

(a) a first electrical differentiator operatively connected to said recording means so that said recorded surface load signals are supplied thereto, (b) a second electrical differentiator operatively connected to said recording means so that said recorded displacement signals are supplied thereto, (c) a summer having inputs operatively connected to said first and said second differentiators and adapted to supply an output signal proportional to the sum of input signals supplied thereto;

an electric transmission line with input means at one end and means for receiving output at a plurality of points along the line, said input means coupled to said signal generator;

an integrator with input and output terminals, said input terminal being operatively connected to the output of said transmission line to receive a current signal therefrom;

display means with X-coordinate and Y-coordinate inputs, one of said inputs being connected to the output of said integrator and the other of said inputs being connected to receive a voltage signal from the output of said transmission line.

References Cited

UNITED STATES PATENTS 3,343,409    9/1967    Gibbs _____ 73—151

JERRY W. MYRACLE, Primary Examiner

U.S. Cl. X.R.

73—141